(No Model.) 2 Sheets—Sheet 1.

L. POH.
LIQUID MEASURE.

No. 474,048. Patented May 3, 1892.

Witnesses:
Wm. M. Rheem
Wm. H. Scott

Inventor
Louis Poh
By Elliott & Quohundro
Attys

THE NORRIS PETERS CO., PHOTO-LITHO., WASHINGTON, D. C.

(No Model.) 2 Sheets—Sheet 2.
L. POH.
LIQUID MEASURE.
No. 474,048. Patented May 3, 1892.
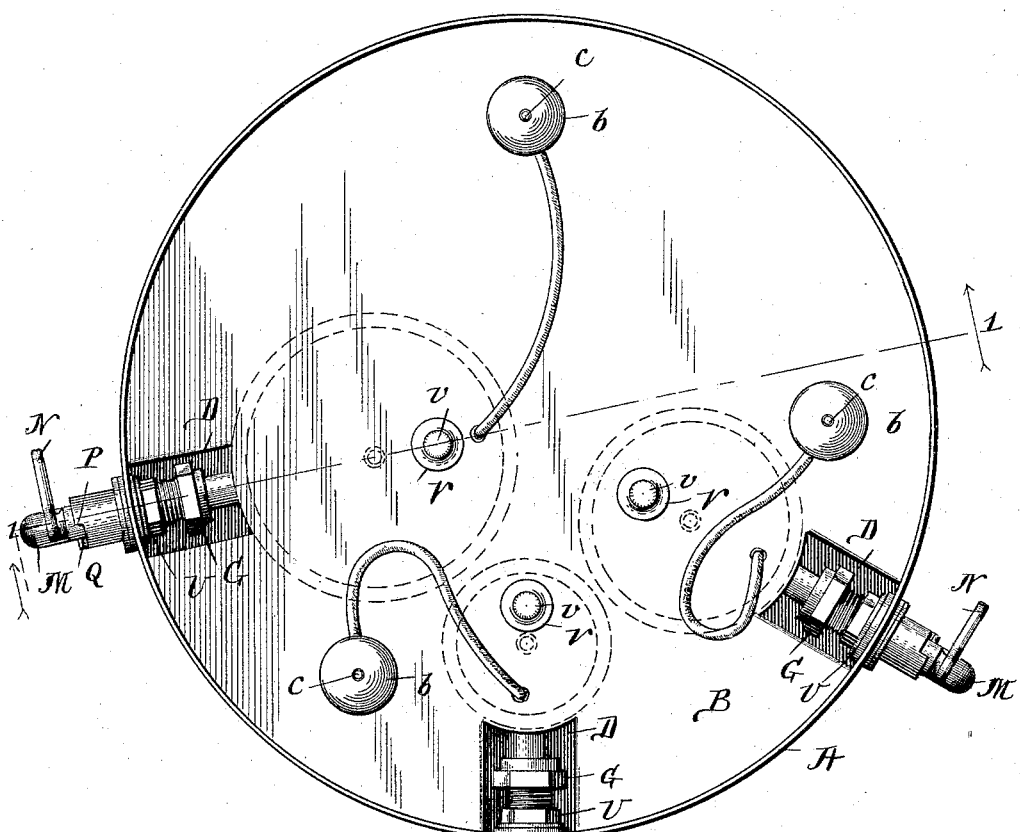
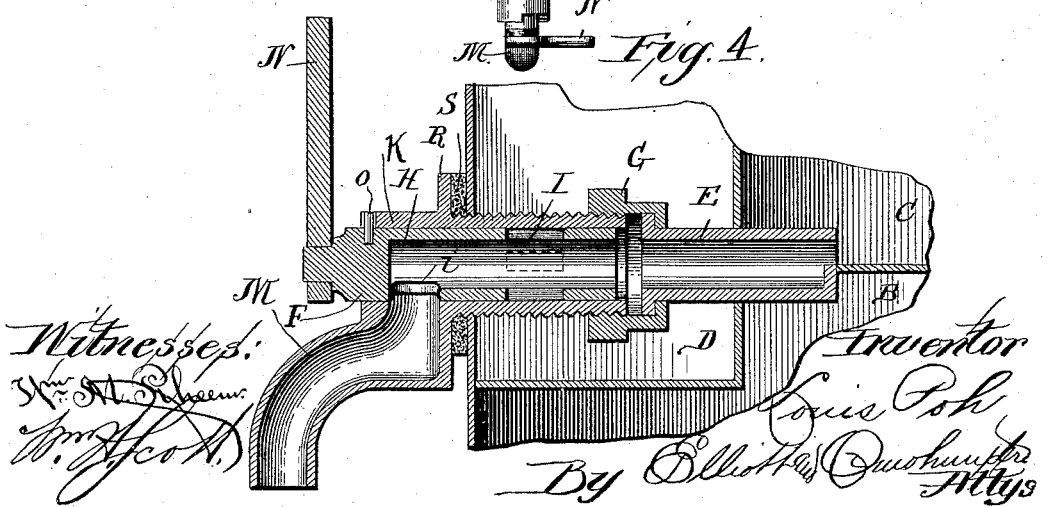
Witnesses: Inventor
Louis Poh
By Elliott & Quickhumper
Attys

UNITED STATES PATENT OFFICE.

LOUIS POH, OF CHICAGO, ILLINOIS.

LIQUID-MEASURE.

SPECIFICATION forming part of Letters Patent No. 474,048, dated May 3, 1892.

Application filed September 24, 1891. Serial No. 406,628. (No model.)

*To all whom it may concern:*

Be it known that I, LOUIS POH, a citizen of the United States, residing in Chicago, in the county of Cook and State of Illinois, have invented certain new and useful Improvements in Liquid-Measures, of which the following is a full, clear, and exact specification.

My invention relates to devices for automatically measuring off predetermined quantities of liquid; and it has for its object to provide a device for this purpose which shall be very simple of construction and manipulation, with no complicated mechanism or frail or costly parts to get out of order, and one in which the cessation of the flow is not dependent upon the turning of a cock or the operation of other mechanism liable to stick or fail to respond at the proper instant, but, on the contrary, shall be so constructed and arranged as to render it impossible to permit more than the given measure to run out at a single manipulation of the controlling device.

My invention also has for its object to provide a device of this character with a variable measure, whereby the capacity thereof may be altered in order to reduce it or increase it to a certain amount in case there should be any miscalculation in the measurement and construction of the measure originally, or in order that the capacity of the measure may be changed from one predetermined amount to another.

A further object of my invention is to provide the device with a signal or alarm which will give notice when the measure has filled ready for drawing off and also when its contents have fully run out, so that the clerk or other operator may be otherwise engaged both while the measure is filling and discharging.

With these ends in view my invention consists in certain features of novelty hereinafter more fully described in connection with the accompanying drawings, and particularly pointed out in the claims.

Figure 1:
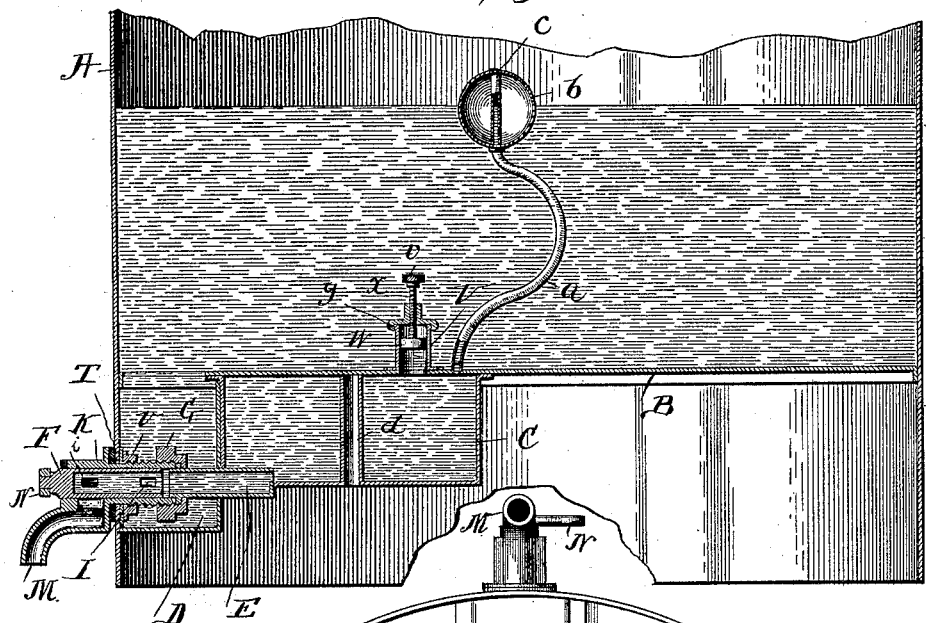
Figure 2:
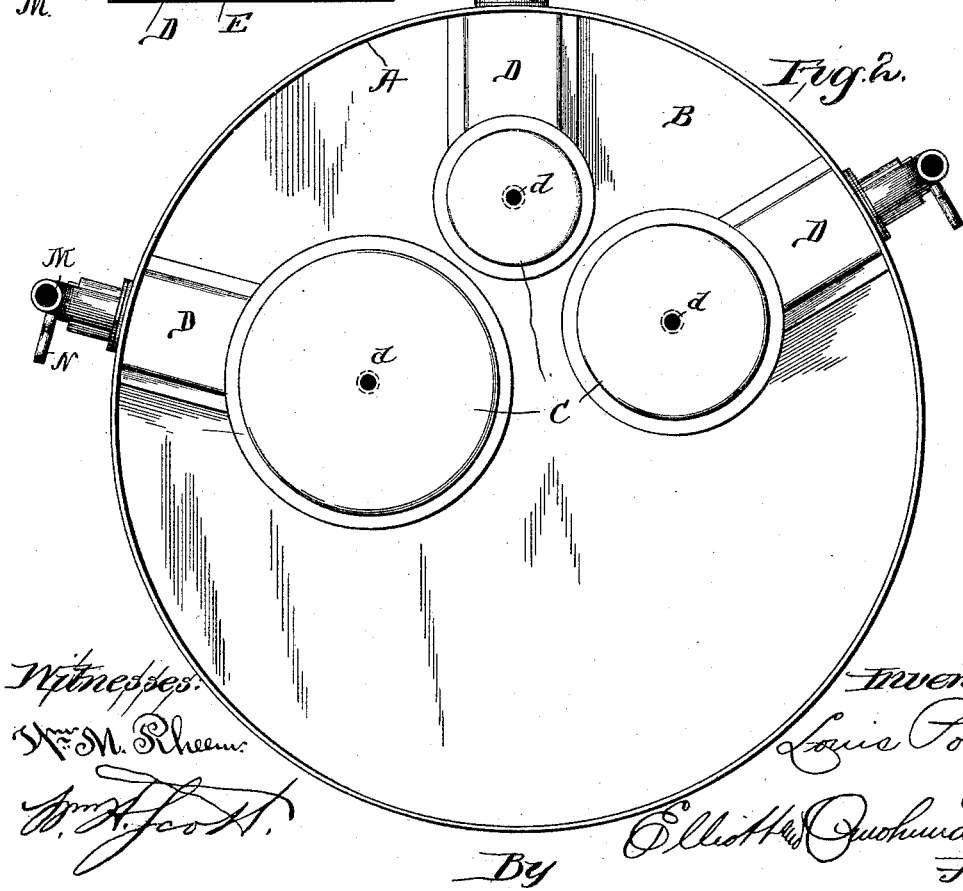

In the said drawings, Figure 1 is a vertical section of a tank or cask having my improvements supplied thereto, taken on the line 1 1, Fig. 3. Fig. 2 is a bottom plan of a barrel or cask provided with my improvements. Fig. 3 is a plan view thereof, looking downward into the cask; and Fig. 4 is an enlarged detail sectional view of the draw-cock, taken on the line 1 1, Fig. 3.

In the drawings, in which like signs of reference indicate like parts throughout the several views, A is a cask or tank of any suitable construction and material for containing the supply of liquid to be dispensed. Secured in or to the bottom B of this tank are a number of separate or independent vessels C, which I shall hereinafter term "measures." These measures may be of any suitable form or size, and the tank may be provided with as many of them as desired.

Between the outer edge of each of the measures C and the tank A is located a downwardly-projecting chamber or basin D, which is in direct communication with the interior of the tank A, and secured in the bottom of each of the measures C is a short tube or pipe E, which projects into the chamber D, and is secured to the inner end of a two-way cock F by means of an ordinary coupling G. As more clearly shown in Fig. 4, this cock F is provided with an internal sleeve or hollow valve H, which has a number of ports I, which are adapted to communicate with the chamber D through side ports in the shell or housing K, so that the liquid in such chamber D may pass into the sleeve or hollow valve K, and thence into the tube E, from which it enters and fills the measure C. The outer end of the valve F, it will be seen, is closed, with the exception of a port *i* in its side, which is so arranged that when the ports I are closed and communication therethrough with the chamber D is shut off it will communicate directly with the discharge-nozzle M of the cock, and, on the other hand, when the ports I are opened the port *i* will be closed.

The valve F is provided with an actuating handle or knob N and a stop-pin O, which is adapted when the handle is turned in one direction to come against a shoulder P and when turned in the opposite direction to come against a shoulder Q, formed on the end of the housing K, and thus automatically limit the movement of the valve when the proper ports coincide. The cock may be secured in the wall of the tank in any suitable and well-known manner. In the form shown in the drawings the housing K is provided with a shoulder or flange R, between which and the exterior of the tank is located a rubber or other suitable gasket S, and against the inner surface of such wall is arranged a gasket T, the whole being clamped together by a nut U, screwed on the inner threaded end of the housing.

In order that the capacity of the measures C may be varied in case they should contain more or less than the proper amount, I have provided each of them on its upper side with a vertical cylinder V, which communicates with the measure and carries an adjustable piston W, which is actuated by a screw-threaded rod X, passing through a removable cap or cover Y on such cylinder, and being provided at its outer end with a turning knob Z, whereby such piston may be adjusted vertically within the cylinder, and thus permit more or less of the liquid within the tank A to rise upward within the cylinder.

In order that the air in the measure C may escape while the water is running in, and in order that such cylinder may receive air while the contents of the measure are running out, I provide the measure with an adjustable vent in the form of a flexible or rubber tube $a$, which has communication through the bottom of the tank A with the measure C at its lower end, and is carried in an upright position by a hollow ball or other suitable float $b$, through which the tube rises to a point above the liquid-level. The purpose of this adjustable or floating vent, it will be understood, is to cause the tube to always contain a given amount of the liquid, for it is obvious that the liquid contained within the tube forms a portion of and is drawn out with the contents of the measure, and if such vent did not rise and fall with the level of the liquid in the main tank the quantity contained within the tube would fluctuate with the rise and fall of the liquid in the tank and thus vary the capacity of the measure C—that is to say, when the liquid is highest in the tank the device would give a larger measure or amount than it would when the level of the liquid is at a lower point.

In order that it may be determined when the air is fully discharged from the measure, I have provided the upper extremity of the tube $a$ with an air-actuated alarm in the form of a small double-acting whistle $c$, which will be sounded as long as the air continues to pass therethrough, either while the liquid is running in to or out of the measure C, thus enabling the attendant or operator to be absent from the apparatus while it is in operation, and to receive a signal or notice upon the instant the measure has fully discharged or filled ready for discharge.

In order to strengthen the measures C C, which are usually constructed of sheet metal, I have provided each of them with a brace $d$ of the usual and well-known construction, and in order that the whole apparatus may be given a firm support without resting upon any of its frail parts I prefer to extend the wall of the tank A downward beyond the lower end of the nozzle M, in the manner shown in Fig. 1.

While I have been particular to describe a tank and a two-way cock, as well as the variable measure of particular and unusual construction, yet I do not wish to be understood as limiting myself to the details thereof, as the same may be varied at will without departing from the spirit of my invention. I also wish it to be understood that it would involve no departure from the spirit of my invention to connect all of the vents to a single tube and float, nor would it involve a departure to so connect the two-way cock to two measures of the same size in such a manner that one of them would be receiving while the other is discharging the liquid.

Having thus described my invention, what I claim as new therein, and desire to secure by Letters Patent, is—

1. In a liquid-measure, the combination, with the main tank or source of supply, of a measure having an adjustable air-vent tube adapted to rise and fall with the level of the liquid in said tank, and a two-way draw-cock for simultaneously closing communication between the tank and measure and permitting the liquid in said measure to escape, substantially as set forth.

2. In a liquid-measure, the combination, with the main tank or source of supply, of a measure in said tank having an adjustable air-vent arranged to adapt itself to the fluctuations of the level of the liquid in the tank, and means for opening communication between said tank and measure and for closing such communication and permitting the contents of the measure to escape, substantially as set forth.

3. In a liquid-measure, the combination, with the main tank or source of supply, of a measure in said tank having a floating air-vent, and means for opening communication between said tank and measure and for closing such communication and permitting the contents of the measure to escape, substantially as set forth.

4. In a liquid-measure, the combination, with the main tank or source of supply, of a measure in said tank having a flexible floating air-vent, and means for opening communication between said tank and measure and for closing such communication and permitting the contents of the measure to escape, substantially as set forth.

5. In a liquid-measure, the combination, with the main tank or source of supply, of a measure in said tank having an air-vent provided with an air-actuated alarm, said vent being adapted to rise and fall with the level of the liquid in the tank, and means for opening communication between said tank and measure and for closing such communication and permitting the contents of the measure to escape, substantially as set forth.

6. In a liquid-measure, the combination, with the main tank or source of supply, of a measure in said tank having a flexible air-vent, a ball supporting said vent and carrying an alarm, and means for opening communication between said tank and measure and for closing such communication and permitting the contents of the measure to escape, substantially as set forth.

7. In a liquid-measure, the combination, with the main tank or source of supply, of a measure in said tank having a floating air-vent provided with a whistle, and means for opening communication between said tank and measure and for closing such communication and permitting the contents of the measure to escape, substantially as set forth.

8. In a liquid-measure, the combination, with the main tank or source of supply, of a measure in said tank, a rubber tube communicating with the upper part of said measure, a float secured to the extremity of said tube, a double-acting whistle on the end of said tube, and means for opening communication between said tank and measure and for closing such communication and permitting the contents of the measure to escape, substantially as set forth.

9. In a liquid-measure, the combination, with the main tank having the chamber or basin D communicating therewith, of the measure C, a two-way cock having communication with said measure and basin D, adapted to alternately close communication between said basin and measure and open communication between the measure and discharge-nozzle, and an adjustable vent communicating with said measure, adapted to rise and fall with the level of the liquid in said tank, substantially as set forth.

LOUIS POH.

Witnesses:
THOS. SMITH,
F. A. HOPKINS.